May 30, 1961 C. B. BENNETT Re. 24,993

WRAPPING MACHINES

Original Filed April 18, 1955 3 Sheets-Sheet 1

INVENTOR
CLIFFORD B. BENNETT

BY Adams & Bush
ATTORNEYS

INVENTOR
CLIFFORD B. BENNETT

BY Adams + Bush
ATTORNEYS

WRAPPING MACHINES

Original Filed April 18, 1955 5 Sheets-Sheet 3

INVENTOR
CLIFFORD B. BENNETT
BY
Adams & Bush
ATTORNEYS

United States Patent Office

Re. 24,993
Reissued May 30, 1961

24,993

WRAPPING MACHINES

Clifford B. Bennett, Atlanta, Ga., assignor to Southern Saw Service, Inc., Atlanta, Ga., a corporation of Georgia Original No. 2,833,098, dated May 6, 1958, Ser. No. 502,043, Apr. 18, 1955. Application for reissue July 14, 1958, Ser. No. 748,553

22 Claims. (Cl. 53—13)

Matter enclosed in heavy brackets [ ] appears in the original patent but forms no part of this reissue specification; matter printed in italics indicates the additions made by reissue.

This invention relates to wrapping machines and has more particular reference to a method of and apparatus for wrapping endless flexible bands, such as band saw blades and the like.

One of the objects of the present invention is to provide a novel method of and improved apparatus for applying a wrapping strip longitudinally about an endless flexible band, such as a band saw blade or the like, to protect the teeth of the blade during shipment and to prevent it from rusting or becoming soiled before it is used.

Another object of the present invention is to provide an improved wrapping machine, as characterized above, having simplified traction and folding means for feeding a band saw blade through the machine and applying a wrapping strip thereto while the band saw blade is suspended from the machine.

Another object of the present invention is to provide an improved wrapping machine, as characterized above, wherein the traction and folding means comprise a pair of relatively movable rollers mounted for rotation about vertical axes.

Another object of the present invention is to provide an improved wrapping machine, as above characterized, having means for forming longitudinal creases in a wrapping strip to facilitate folding the marginal flanges of the strip about a blade.

A further object of the present invention is to provide a wrapping machine, as above characterized, which is simple and rugged in construction, very efficient in operation, and can be controlled by a single operator.

Other objects and advantages of the invention will appear in the following description, when considered in connection with the accompanying drawings, wherein.

Figure 1:
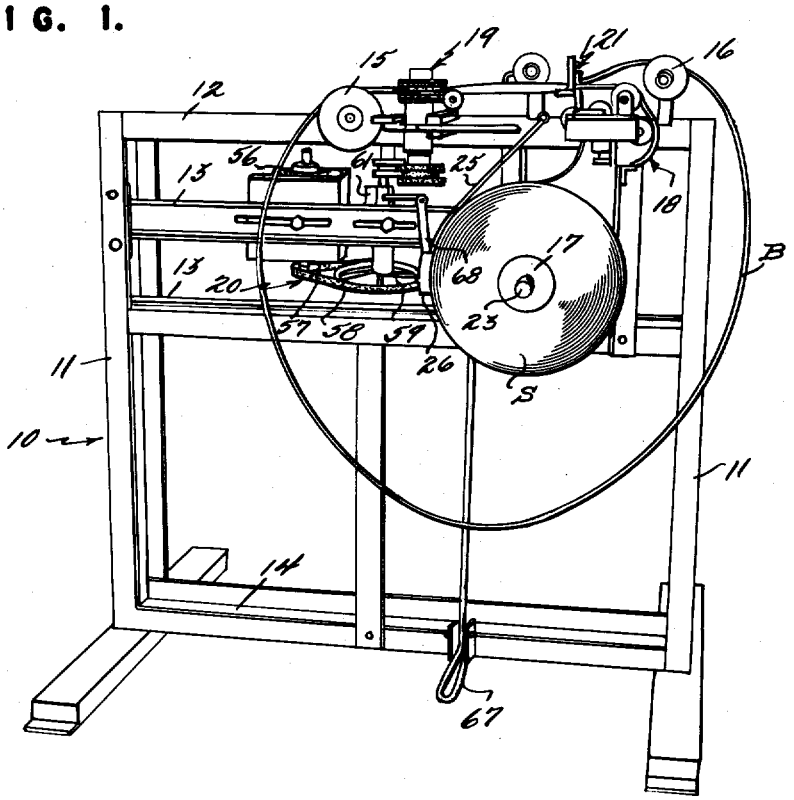
Fig. 1 is a perspective view of a wrapping machine embodying the invention.

Referring now to the drawings, there is illustrated in Fig. 1, one embodiment of a wrapping machine constructed in accordance with the present invention. As there shown, the machine comprises a supporting frame 10, made of structural angles or the like and including vertical end frame members 11, 11, top, intermediate and bottom horizontal frame members 12, 13 and 14, respectively, a pair of longitudinally alined and spaced apart flanged idle rollers 15, 16, carried by the upper horizontal frame members and postioned to suspend a band saw blade B so that it hangs down vertically at the front or operator's side of the machine; a reel 17 suitably mounted on an intermediate horizontal frame member adjacent one end of the machine and carrying a roll of paper strip S for wrapping the blades; a system of rollers, indicated generally at 18, for forming spaced parallel longitudinal creases in the strip of paper at it is fed into the machine; folding and traction mechanism, indicated generally at 19, carried by the upper horizontal frame members and positioned to engage the saw blade and wrapping strip, fold the strip about the blade and pull the blade, with the strip folded thereabout, through the machine; driving mechanism, indicated generally at 20, for driving the folding and traction mechanism; and a cutting device, indicated generally at 21, positioned to be operated to cut the paper wrapping strip after a blade has been wrapped.

Figure 2:
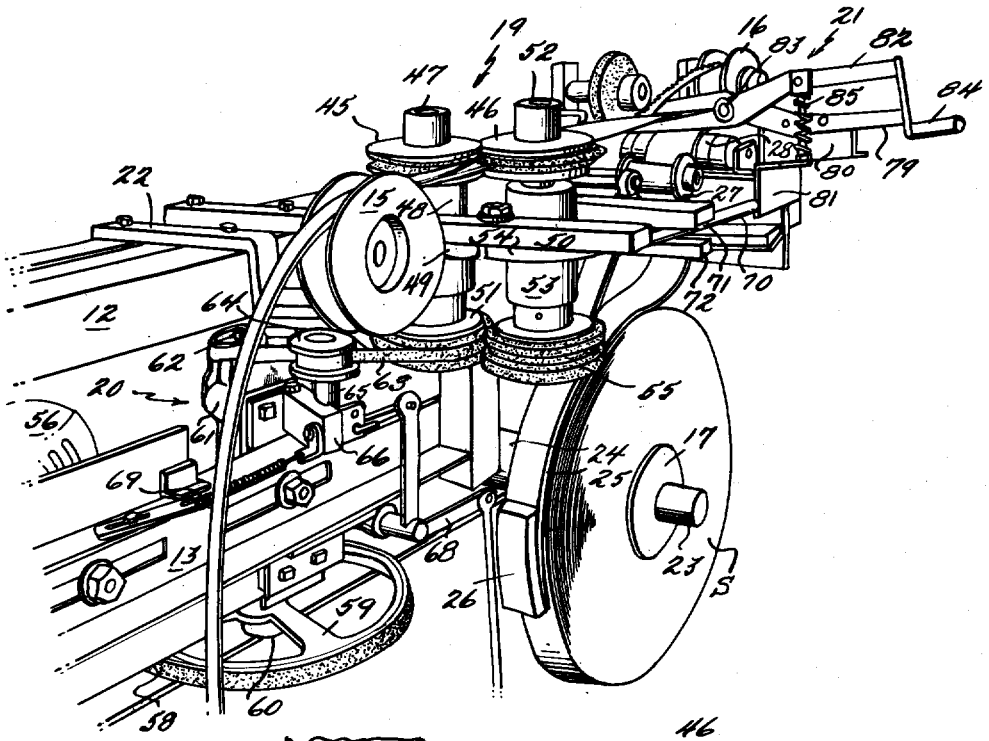
Fig. 2 is a fragmentary perspective view of the forward part of the machine shown in Fig. 1.
Figure 6:
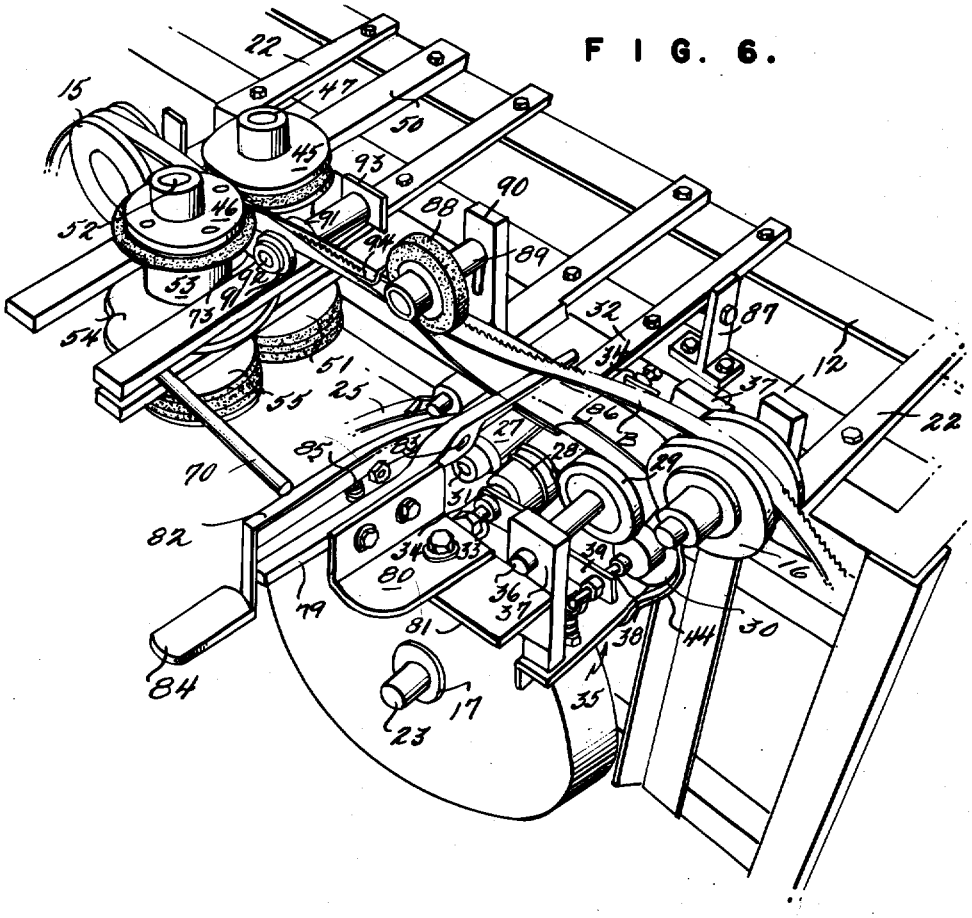
Fig. 6 is a fragmentary perspective view of the rear part of the machine shown in Fig. 1.
Figure 7:
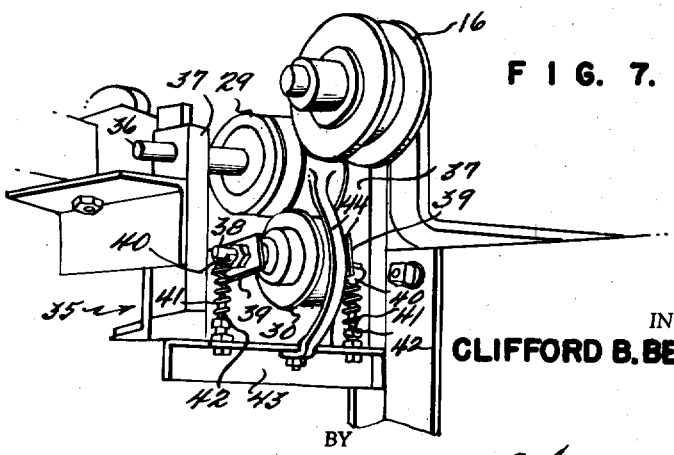
Fig. 7 is a fragmentary perspective view showing the details of the creasing rollers.

The flanged idle rollers 15 and 16 are mounted for rotation about horizontal axes and are carried by bracket members 22 suitably secured to the upper horizontal frame members 12 (see Figs. 2 and 6).

The reel 17, carrying a roll of strip wrapping paper, is mounted on a shaft 23 journaled in a bearing 24 suitably mounted on the lower intermediate horizontal frame member 13. In order to retard the rotation of the roll of paper, a strap 25 has its upper end suitably secured to a bracket mounted on the frame and carries a weight 26 at its lower end engaging the roll of paper (see Fig 2). The paper strip S from the roll on the reel is fed upward between the system of feeding and creasing rollers 18, where it is creased at is passes between the creasing rollers.

The system of rollers for guiding and creasing the paper wrapping strip comprises four idle rollers 27, 28, 29 and 30, each mounted for rotation about a horizontal shaft suitably mounted on the machine. The idle roller 27 is a flanged guide roller and is mounted on a shaft 31 carried by a bracket 32 secured to the upper horizontal frame member 12 of the machine frame. The idle roller 28 is a flanged guide roller and is mounted on a shaft 33, suitably journaled in vertical members 34, 34 forming part of a bracket assembly, indicated generally at 35 and suitably secured to the upper horizontal frame members 12 of the machine frame. The idle rollers 29 and 30 are flanged coacting creasing rollers. The roller 29 is mounted on a shaft 36, suitably mounted in vertical members 37, 37 forming part of the bracket assembly 35. The roller 30 is mounted on a shaft 38 carried by spaced-apart members 39, 39 which are pivotally mounted at one end on the vertical bracket members 37, 37. The shaft 38 is normally pressed upwardly by journal members 40, 40 carried by coil springs 41, 41 mounted on stems 42, 42 secured to a horizontal bracket member 43 of the bracket assembly 35. The construction is such that the flanges of the roller 30 are pressed into the paper strip to form spaced parallel creases thereon as the strip moves between the two coacting creasing rollers. The spring and pivotal mounting of the shaft 38 permits pulling the roller 30 away from the fixed roller 29 to permit threading the paper strip between the two rollers. An arcuate shaped hold-down guide member 44, mounted on the bracket member 43, guides the strip as it passes over the flanged roller 29.

Figure 5:
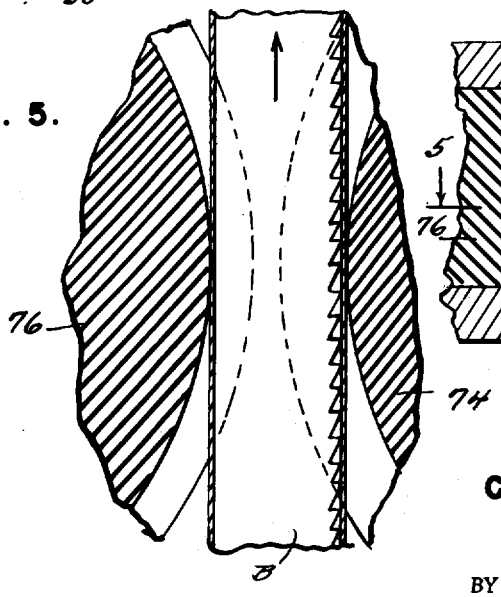
Fig. 5 is a horizontal sectional view taken on the line 5—5 of Fig. 4.
Figure 4:
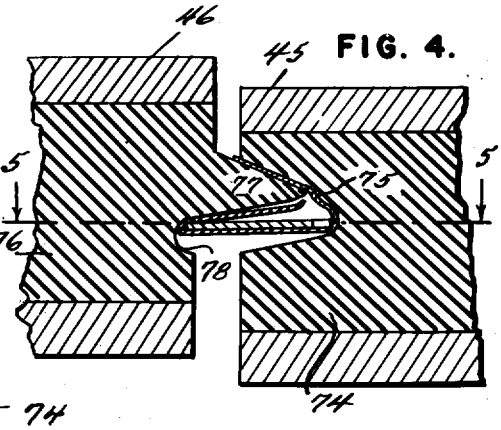
Fig. 4 is a fragmentary vertical sectional view of the traction and folding rollers shown in Fig. 1, but on an enlarged scale.

The folding and traction mechanism, indicated generally at 19, for pulling the band saw blade through the machine and folding the wrapping strip around the blade as it moves through the machine, is shown as comprising a pair of flanged traction and folding rollers 45, 46 having soft rubber peripheries formed to the particular shape shown in Figs. 4 and 5. The roller 45 is fixedly attached to the upper end portion of a vertical shaft 47 mounted in a vertical cylindrical bearing 48 having a collar 49 fixedly attached to a bracket member 50 secured to the upper horizontal frame member 12 of the machine frame. A driving roller 51 having a rubber periphery is fixedly attached to the bottom portion of the shaft 47. The roller 46 is fixedly attached to the upper end portion of a vertical shaft 52 mounted in a vertical cylindrical bearing 53 having a collar 54 pivotally connected to the bracket member 50, so that the bearing member 53 may be swung in an arc in a horizontal plane toward and from the fixed bearing member 48. A drive roller 55 having a rubber periphery is fixedly attached to the bottom portion of the shaft 52 and positioned to be moved into and out of frictional driving engagement with the drive roller 51 on the shaft 47 as the movable bearing member 53 is swung toward and away from the fixed bearing member 48.

The mechanism for driving the folding and traction rollers, indicated generally at 20, comprises a motor 56, suitably secured to the intermediate horizontal frame member 13 and mounted for rotation about a vertical axis. The motor has a small pulley 57 fixed to the bottom of its rotor shaft, which drives, as by means of a V-belt 58, a large pulley 59 fixedly attached to the bottom of a vertical shaft 60 journaled in a vertical bearing member 61 suitably secured to the frame member 13. A small pulley 62 is fixedly attached to the upper end of the shaft 60 and drives, by means of a V-belt 63, the driven roller 51 on the vertical shaft 47. The belt 63 sits in a groove in the outer periphery of the roller 51 and the belt is normally so loose that, with the motor running, the belt slips around the roller 51 without causing it to rotate. An idle pulley 64, mounted on a vertical shaft 65 carried by a lever 66 pivotally attached to the frame member 13, is positioned to be moved into and out of engagement with the outer surface of the belt 63. When the idler pulley is "out" there is no drive of the roller 51, but when the idler pulley is "in" the belt is tight so that driving occurs. A foot treadle 67 is connected by linkage 68 to the idler pulley lever 66, so that when the foot treadle is depressed the idler tensions the belt and produces a drive. A coil spring 69 normally holds the lever 66 retracted to hold the idler pulley in "out" position.

When the foot treadle is depressed, the roller 51 is driven and, through the shaft 47, drives the traction and folding roller 45. The collar 54 of the bearing member 54 is provided with a handle 70 for moving the bearing member toward and from the fixed bearing member 48. The handle 70 extends and slides between a vertically spaced pair of bracket members 71, 72 carried by the upper horizontal frame member 12. A stop 73 is formed on the collar 49 of the fixed bearing member 48 and positioned to engage the collar 54 when the rollers 45, 46 and 51, 55 are in proper engagement.

As shown in Figs. 4 and 5, the traction and folding roller 45, which rotates about a fixed vertical axis, carries a soft rubber collar 74 having a peripheral V-groove to receive the folded edge of the paper strip and blade; the upper leg of the V having a slight offset 75 spaced a short distance from the bottom of the V. The traction and folding roller 46 extends [hlightly] *slightly* above the roller 45 and carries a soft rubber collar 76 having an integral, thin, annular fin 77 of triangular cross section which interfits in the V of the roller 45 when the roller 46 is moved into operating position by the handle 70. An annular rounded bottom groove 78 is formed in the rubber collar 76 below the base of the fin 77 and receives the other folded edge of the paper strip and blade. In Fig. 4, the two rollers 45, 46 are shown in interlocking engagement for folding the paper strip over the blade and pulling the folded-over strip and blade through the machine by engagement with the side edges of the wrapped blade.

The cutting device, indicated generally at 21, for cutting the paper strip after the blade has been wrapped, as best seen in Figs. 2 and 6, comprises a scissor-like member having an elongated fixed blade 79 secured adjacent its outer end to a bracket member 80 which, in turn, is secured to a horizontal bracket member 81 carried by the bracket assembly 35 and extends inwardly and across the path of travel of the paper strip; a movable blade 82 pivoted on the fixed blade, as at 83, with its outer end provided with a dependant L-shaped handle member 84 and its inner end extending inwardly across the path of travel of the paper strip; and a coil spring 85 mounted on the bracket member 81 and engaging the outer end portion of the movable blade for normally holding the scissor-like member open. A flat plate or platform 86 for supporting the severed end of the paper strip is provided. The platform is placed in the path of the paper strip adjacent the scissors member with its rod or handle supported by a bracket member 87 fixed to the upper frame member [20] *12*.

Figure 3:
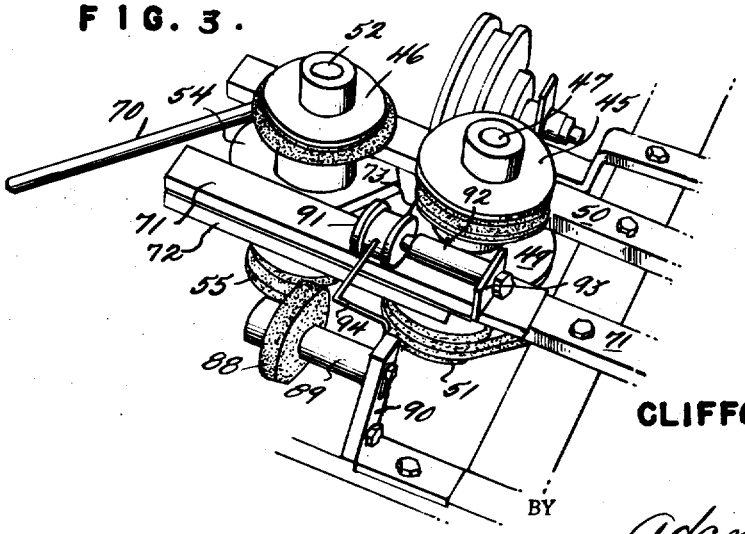
Fig. 3 is a fragmentary perspective view of the traction and folding rollers shown in Fig. 1.

The machine is also provided with a hold-down idle roller 88 having a width less than the width of the table, mounted for rotatiton about a horizontal shaft 89 vertically adjustably mounted in a support bracket 90 carried by the upper frame member 12, and a double flanged guide idle roller 91 mounted for rotation about a horizontal shaft 92 supported by a bracket 93 mounted on the frame member 12. A hold-down rod 94 for holding the overlapped flanges of the wrapping strip tight against the blade after the wrapped portion of the blade has made a complete circuit so that the short section of the blade which is wrapped twice will attain a flat tight wrap is also mounted on the bracket 90 (see Figs. 3 and 6).

The operation of the machine is as follows:

First, the operator takes the band saw blade to be wrapped and places it on the idle rollers 15 and 16 so that it will hang vertically suspended at the front of the machine. The blade is depressed beneath the idle roller 88 and is inserted into the V-groove of the folding roller 45. Next, the paper strip is fed between the idle guide rollers 27, 28, over the roller 28, then upwardly between the cooperating creasing rollers 29, 30 and over the roller 29. The hold-down and guiding member 44 holds the strip against the roller 29. The paper strip leaves the roller 29 in a horizontal direction, passes over the platform 86 below the stationary blade 79 of the cutter, below the fixed idle roller 88, which presses the saw blade down into engagement with the paper, starting the formation of a trough in the paper, and enters between the flanges of the double flanged guide roller 91 so that the formation into a trough is completed (see Fig. 6). Finally, the trough shaped paper strip with the blade lying in the hollow of the trough goes between the traction and folding rollers 45, 46.

The swingable roller 46 is in open position when the trough shaped strip with the blade inside the trough is passed between the two folding rollers. First, the points of the trough are depressed so that the assembly of blade and strip can be led into the V-shaped recess of the roller 45. The outer or top flange or margin of the paper strip springs up against the upper surface of the V in the folder roller, while the inner margin or flange of the paper strip springs up against the top or outer margin or flange portion of the strip. While in this position, the movable folder roller 46 is moved by the handle 70 into operative position so that the thin fin 77 extends over and depresses the inner marginal edge of the wrapping strip. The near edge of the blade, with its wrapping, bears against the base of groove 78 in the roller 46, the far edge of the blade, with its paper wrapping, fits in the throat of the V-groove in the folder roller 45. The edge of the fin 77 comes adjacent the offset 75 on the upper surface of the V-groove. The operator now steps on the pedal 67 and the machine continues the wrapping, the folding and driving being accomplished from the two rubber traction and folding rollers 45, 46. The wrapped blade, flexing over the flanged idle roller 15, causes the overlapped margins of the wrapping strip to be held tightly against the upper surface of the blade. After the blade has been completely wrapped, the operator, without stopping the machine, strikes the cutter handle 84 and the strip is severed. The hold-down rod 94 insures that the short section of the blade which is wrapped twice attains a flat tight wrap. Also, the inertia over-run of the wrapping strip causes the [severad] *severed* end of the strip to project about ¾″ after the movable member of the cutter is moved to open position by the spring 85, thus eliminating the necessity of again threading the paper strip through the creasing rollers.

Preferably, and as illustrated in the drawings, the band saw blade is placed in the machine with its tooth edge away from the front side of the machine. This permits the rubber collar on the roller 45 to engage the trailing edges of the teeth and this tends to prevent the sharp points of the teeth from pushing through the paper and prevents the operator from accidentally coming into contact with the toothed edge while the blade is moving through the machine.

From the foregoing description, it will be apparent that the machine is very simple in its construction and can be easily operated by a single workman. The margins of the paper strip are brought into overlapping position at the outside of the blade and are so held as the blade travels in its closed orbit, for the reason that each margin would have to increase in length to unfold. The overlapped margins of the wrapping strip closely engage the surface of the blade and do not tend to become unfolded during the manipulation of the blade to fold it into small convolutions. The wrapped blades are fully protected from moisture, which would cause rusting, and the teeth are shielded by the wrapper so that they will not rub against the teeth of other blades during transportation. The wrapper can easily be slipped off the blades at the point of use.

Obviously, the invention is not restricted to the particular embodiment thereof herein shown and described.

What is claimed is:

1. In a machine for applying a wrapping strip longitudinally about a band saw blade or the like, a supporting frame; a spaced pair of flanged guide rollers each rotatable about a horizontal axis for supporting the blade suspended at the front side of said frame; means for supplying a wrapping strip longitudinally of the blade to engage one face thereof; a pair of relatively movable coacting horizontally aligned traction and folding rollers, each mounted for rotation about a vertical axis for pulling the blade and wrapping strip through the machine and folding the marginal edges of the wrapping strip over the outer surface of the blade; and power operated means connected to drive the traction and folding rollers.

2. Apparatus as set forth in claim 1, including a pair of coacting creasing rollers mounted on the frame between which the wrapping strip is fed to form two spaced longitudinal creases about which the opposite margins of the strip are adapted to be folded.

3. Apparatus as set forth in claim 1, wherein said coacting traction and folding rollers are located opposite each other on opposite sides of the path of travel of the blade and strip and each having strip folding means adapted to engage one marginal flange of the strip and fold it down on the upper surface of the blade and a recess coacting to form a passageway adapted to receive the side edge of the blade with the marginal flange of the strip folded thereon and pull the blade and strip through the machine by pressure exerted on the strip-wrapped edges of the blade.

4. Apparatus as set forth in claim 3, wherein one of said traction and folding rollers is provided with a peripheral >-shaped recess adapted to receive the strip and blade and the other of said traction and folding rollers is provided with an outwardly projecting peripheral flange adapted to be received within said >-shaped recess when said traction and folding rollers are in operation to engage and fold one marginal flange of said strip down on the upper surface of the blade.

5. Apparatus as set forth in claim 4, wherein said peripheral flange is substantially triangular in vertical cross section and wherein the upper surface of said >-shaped recess is provided with an abutment positioned adjacent the edge of said peripheral flange when said rollers are in folding operative engagement.

6. In a machine for applying a wrapping strip longitudinally about a band saw blade or the like, a supporting frame; means for supplying a wrapping strip longitudinally of the blade to engage one face thereof; a spaced pair of flanged guide rollers each rotatable about a horizontal axis for supporting the blade suspended at the front side of said frame; a pair of relatively movable coacting traction and folding rollers, each mounted for rotation about a vertical axis for pulling the blade and wrapping strip through the machine and folding the marginal edges of the wrapping strip over the outer surface of the blade; a first strip guide roller rotatable about a horizontal axis for supporting the wrapping strip and directing its path of travel in a substantially horizontal plane into engagement with the under side of said blade; a hold-down idle roller rotatable about a horizontal axis to engage the blade between the traction and folding rollers and said strip guide roller; a second strip guide roller rotatable about a horizontal axis and positioned between said hold-down idle roller and said traction and folding rollers; means for rotatably mounting the guide rollers on the frame with said hold-down idle roller so positioned that it is effective to cause the blade to move in a downward convex path into engagement with said traction and folding rollers and to cause the strip to be partially folded to a channel shape with the blade therein; and power operated means connected to drive the traction and folding rollers for pulling the blade and strip through the machine.

7. Apparatus as set forth in claim 6, wherein one of said traction and folding rollers is fixedly attached to a vertical shaft journaled in a bearing member fixedly mounted on said frame and the other of said traction and folding rollers is fixedly attached to a vertical shaft journaled in a bearing member pivotally mounted on said frame and handle means connected to said pivoted bearing member for swinging it about its pivotal axis to bring the traction and folding rollers into operative engagement.

8. Apparatus as set forth in claim 7, wherein the vertical shafts which carry the traction and folding rollers each carries a friction driving roller secured to its bottom end portion, said friction driving rollers being positioned to engage each other when said movable bearing member is swung into operative position, and wherein the power operated means connected to drive the traction and folding rollers includes belting connected to drive the friction drive roller carried by the vertical shaft journaled in the fixed bearing member.

*9. A method for applying a wrapping strip longitudinally about an endless flexible metal band which comprises suspending said endless band in a substantially vertical dependent position, longitudinally underlaying the inside of said band with a plane strip of a flexible wrapping material with said band being intermediate the marginal edges thereof, co-extensively advancing said band and said strip of wrapping material in a forward path in a closed circuit, partially folding the marginal edges of said plane strip over the edges and the outside of said band to produce a partially wrapped band, and then moving the partially wrapped band in a downward path oblique to said forward path to flex said band and place the partially folded marginal edges of the plane strip of wrapping material into overlapping abutment each with the* other to tightly ensheathe said band with said wrapping material.

10. A method for applying a wrapping strip longitudinally about an endless flexible metal band which comprises suspending said endless band in a dependent position, longitudinally underlaying the inside of said band with a plane strip of a flexible wrapping material with said band being intermediate the marginal edges thereof, co-extensively advancing said band and said strip of wrapping material in a forward path in a closed circuit, partially folding the marginal edges of said plane strip over the edges and the outside of said band to produce a partially wrapped band, and then moving the partially wrapped band in a downward path oblique to said forward path to flex said band and place the partially folded marginal edges of the plane strip of wrapping material into overlapping abutment each with the other to tightly ensheathe said band with said wrapping material.

11. A method for applying a wrapping strip longitudinally about an endless flexible metal band which comprises suspending said endless band in a dependent position on spaced guide means, longitudinally underlaying the inside of said band with a plane strip of a flexible wrapping material with said band being intermediate the marginal edges thereof, co-extensively advancing said band and said strip of wrapping material in a forward path in a closed circuit through force applied to the edges of said band, partially folding the marginal edges of said plane strip over the edges and the outside of said band to produce a partially wrapped band, and moving the partially wrapped band in a downward path oblique to said forward path over one of said guide means to flex said band and then place the partially folded marginal edges of the plane strip of wrapping material in overlapping abutment each with the other to tightly ensheathe said band with said wrapping material.

12. A method for applying a wrapping strip longitudinally about an endless flexible metal band which comprises suspending said endless band in a substantially vertical dependent position on a pair of spaced flanged guide rollers, longitudinally underlaying the inside of said band with a plane strip of a flexible wrapping material with said band being intermediate the marginal edges thereof, co-extensively advancing said band and said strip of wrapping material in a forward path in a closed circuit through force applied to the edges of said band, partially folding the marginal edges of said plane strip over the edges and the outside of said band to produce a partially wrapped band, and moving the partially wrapped band in a downward path oblique to said forward path over one of said guide rollers to flex said band to then place the partially folded marginal edges of the plane strip of wrapping material in overlapping abutment each with the other to tightly ensheathe said band with said wrapping material.

13. A method for applying a wrapping strip longitudinally about an endless flexible metal band which comprises suspending said endless band in a substantially vertical dependent position over a pair of spaced guide rollers, forming a pair of spaced longitudinal creases in a plane strip of a flexible wrapping material, longitudinally underlaying the inside of said band with said plane strip with said band being intermediate said spaced creases, co-extensively advancing said band and said strip of wrapping material in a forward path in a closed circuit through force applied to the edges of said band, partially folding the marginal edges of said plane strip over the edges and the outside of said band to produce a partially wrapped band, and moving the partially wrapped band in a downward path oblique to said forward path over one of said guide rollers to flex said band whereby the partially folded marginal edges of said wrapping material are brought into overlapping abutment each with the other to tightly ensheathe said band with said wrapping material.

14. A method for applying a wrapping strip longitudinally about an endless flexible metal band which comprises suspending said endless band in a dependent position over a pair of spaced guide rollers, forming a pair of spaced longitudinal creases in a plane strip of a flexible wrapping material, longitudinally underlying the inside of said band with said plane strip with said band being intermediate said spaced creases, co-extensively advancing said band and said strip of wrapping material in a forward path in a closed circuit through force applied to the edges of said band, folding the marginal edges of the strip of flexible wrapping material upwardly along the longitudinal creases formed in said strip to provide upstanding marginal flanges on said strip, partially folding the marginal flanges of said plane strip over the edges and the outside of said band to produce a partially wrapped band, and moving the partially wrapped band in a downward path oblique to said forward path over one of said guide rollers to flex said band whereby the partially folded marginal edges of said wrapping material are brought into overlapping abutment each with the other to tightly ensheathe said band with said wrapping material.

15. A method for applying a wrapping strip longitudinally about an endless flexible metal band which comprises suspending said endless band in a substantially vertical dependent position on a pair of spaced flanged guide rollers, forming a pair of spaced longitudinal creases in a plane strip of a flexible wrapping material, longitudinally overlaying the inside of said band with said plane strip with said band being intermediate said spaced creases, co-extensively advancing said band and said strip of wrapping material in a forward path in a closed circuit through force applied to the edges of said band, folding the marginal edges of the strip of flexible wrapping material upwardly along the longitudinal creases formed in said strip to provide upstanding marginal flanges on said strip, simultaneously partially folding the marginal flanges of said plane strip over the edges and the outside of said band to produce a partially wrapped band, and moving the partially wrapped band over one of said guide rollers to flex said band in a downward path oblique to said forward path whereby the partially folded marginal flanges of said wrapping material are brought into overlapping abutment each with the other to tightly ensheathe said band with said wrapping material.

16. In a machine for applying a wrapping strip longitudinally about a band saw blade or the like, a supporting frame; a spaced pair of guide means for vertically suspending the blade depending from said frame; means for supplying a wrapping strip longitudinally of the blade to engage the inner face thereof; a pair of opposed folding means positioned between said guide means engaging the blade and the wrapping strip at the edges of said blade to partially fold the marginal edges of said wrapping strip over the outer surface of the blade; and means for co-extensively advancing said wrapping strip and said blade between said folding means through force applied to the edges of said band, said machine being free of means for applying opposed, pinch forces to the outer faces of the wrapping strip for creasing the partially folded marginal edges of said wrapping strip into the closed position.

17. A method for applying a wrapping strip longitudinally about an endless flexible metal band which comprises suspending said endless band in a dependent position on a pair of spaced guide means, one of said guide means being super-elevated with respect to the other guide means, longitudinally underlaying the inside of said band with a plane strip of a flexible wrapping material, with said band being intermediate the marginal edges thereof, downwardly biasing said band onto said strip of wrapping material intermediate said spaced guide means below the normal path of travel of said band between said guide means, co-extensively advancing said band and said strip of wrapping material in a forward path in a closed circuit through force applied to the edges of said band, partially folding the marginal edges of said plane strip over the edges and outside of said band to produce a

*partially wrapped band, moving the partially wrapped band in a downward path oblique to said forward path over one of said guide means to flex said band whereby the partially folded marginal edges of the plane strip of wrapping material are brought into overlapping abutment each with the other to tightly ensheathe said band with said wrapping material.*

*18. A method for applying a wrapping strip longitudinally about an endless flexible metal band which comprises suspending said endless band in a substantially vertical dependent position on a pair of spaced flanged guide rollers, one of said rollers being super-elevated with respect to the other, longitudinally underlaying the inside of said band with a plane strip of a flexible wrapping material with said band being intermediate the marginal edges thereof, downwardly biasing said band onto said strip of wrapping material intermediate said guide rollers below the normal path of travel of said band between said guide rollers, co-extensively advancing said band and said strip of wrapping material in a forward path in a closed circuit through force applied to the edges of said band, partially folding the marginal edges of said plane strip over the edges and the outside of said band to produce a partially wrapped band, moving the partially wrapped band in a downward path over one of said guide rollers to flex said band whereby the partially folded marginal edges of the plane strip of wrapping material are brought into overlapping abutment each with the other to tightly ensheathe said band with said wrapping material.*

*19. A method for applying a wrapping strip longitudinally about an endless flexible metal band which comprises suspending said endless band in a substantially vertical dependent position over a pair of spaced guide rollers, one of said guide rollers being super-elevated with respect to the other guide roller, longitudinally underlaying the inside of said band with a plane strip of a flexible wrapping material, forming a pair of spaced longitudinal creases in said strip of wrapping material, said band being intermediate said spaced creases, co-extensively advancing said band and said strip of wrapping material in a forward path in a closed circuit through force applied to the edges of said band, partially folding the marginal edges of said plane strip over the edges and the outside of said band to produce a partially wrapped band, moving the partially wrapped band in a downward path oblique to said forward path over one of said guide rollers to flex said band whereby the partially folded marginal edges of said wrapping material are brought into overlapping abutment each with the other to tightly ensheathe said band with said wrapping material.*

*20. A method for applying a wrapping strip longitudinally about an endless flexible metal band which comprises suspending said endless band in a dependent position over a pair of spaced guide rollers, one of said guide rollers being super-elevated with respect to the other guide roller, longitudinally underlaying the inside of said band with a plane strip of a flexible wrapping material, forming a pair of spaced longitudinal creases in said strip of wrapping material, said band being intermediate said spaced creases, co-extensively advancing said band and said strip of wrapping material in a forward path in a closed circuit through force applied to the edges of said band, downwardly biasing said band onto said strip of wrapping material between the guide rollers and below the normal path of travel of the band between the rollers to fold the marginal edges of the strip of flexible wrapping material upwardly along the longitudinal creases formed in said strip to provide upstanding marginal flanges on said strip, partially folding the marginal flanges of said strip over the edges and the outside of said band to produce a partially wrapped band, moving the partially wrapped band in a downward path oblique to said forward path over one of said guide rollers to flex said band whereby the partially folded marginal edges of said wrapping material are brought into overlapping abutment each with the other to tightly ensheathe said band with said wrapping material.*

*21. A method for applying a wrapping strip longitudinally about an endless flexible metal band which comprises forming a pair of spaced longitudinal creases in the wrapping strip, suspending said endless band in a substantially vertical dependent position over a pair of spaced guide rollers, longitudinally underlaying the inside of said band with a plane strip of a flexible wrapping material downwardly biasing said band onto said strip of wrapping material between said guide rollers below the normal path of travel of said band between said rollers to press the band to the strip between the longitudinal creases in said strip of wrapping material, co-extensively advancing said band and said strip of wrapping material in a forward path in a closed circuit through force applied to the edges of said band, folding the marginal edges of the strip of flexible wrapping material upwardly along the longitudinal creases formed in said strip to provide upstanding marginal flanges on said strip, simultaneously partially folding the marginal flanges of said plane strip over the edges and the outside of said band to produce a partially wrapped band, moving the partially wrapped band over one of said guide rollers to flex said band in a downward path oblique to said forward path whereby the partially folded marginal flanges of said wrapping material are brought into overlapping abutment each with the other to tightly ensheathe said band with said wrapping material.*

*22. Apparatus as set forth in claim 1 wherein one of said spaced guide rollers is super-elevated with respect to the other roller, and including biasing means intermediate said rollers for downwardly urging said blade below the normal path of travel of said blade between said rollers onto said wrapping strip to initiate the formation of a trough in said strip.*

References Cited in the file of this patent or the original patent

UNITED STATES PATENTS

| | | |
|---|---|---|
| 550,377 | Mann | Nov. 26, 189 |
| 1,411,779 | Glaze | Apr. 4, 192 |
| 2,033,201 | MacChesney | Mar. 10, 193 |
| 2,213,242 | Drew | Sept. 3, 194 |
| 2,458,971 | Wilson et al. | Jan. 11, 194 |
| 2,565,444 | Waters | Aug. 21, 195 |
| 2,624,166 | Valiquet | Jan. 6, 195 |
| 2,649,035 | Cloud | Aug. 18, 195 |

FOREIGN PATENTS

| | | |
|---|---|---|
| 327,229 | Great Britain | Apr. 3, 193 |